March 22, 1966     D. L. THATCHER ETAL     3,241,884
STADIUM SEAT CONSTRUCTION
Filed Dec. 6, 1963     2 Sheets-Sheet 1
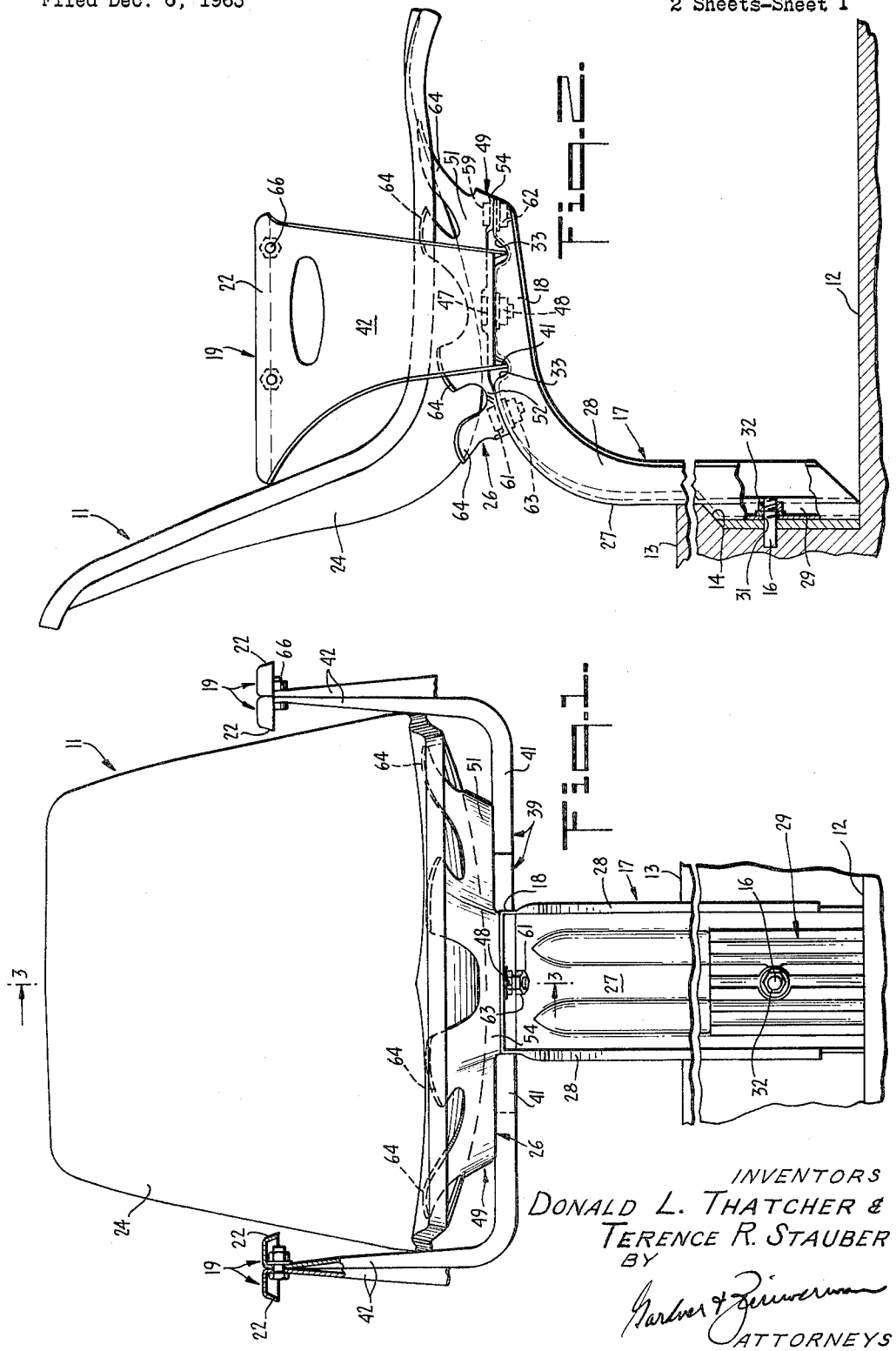
INVENTORS
DONALD L. THATCHER &
TERENCE R. STAUBER
BY
Gardner & Zimmerman
ATTORNEYS

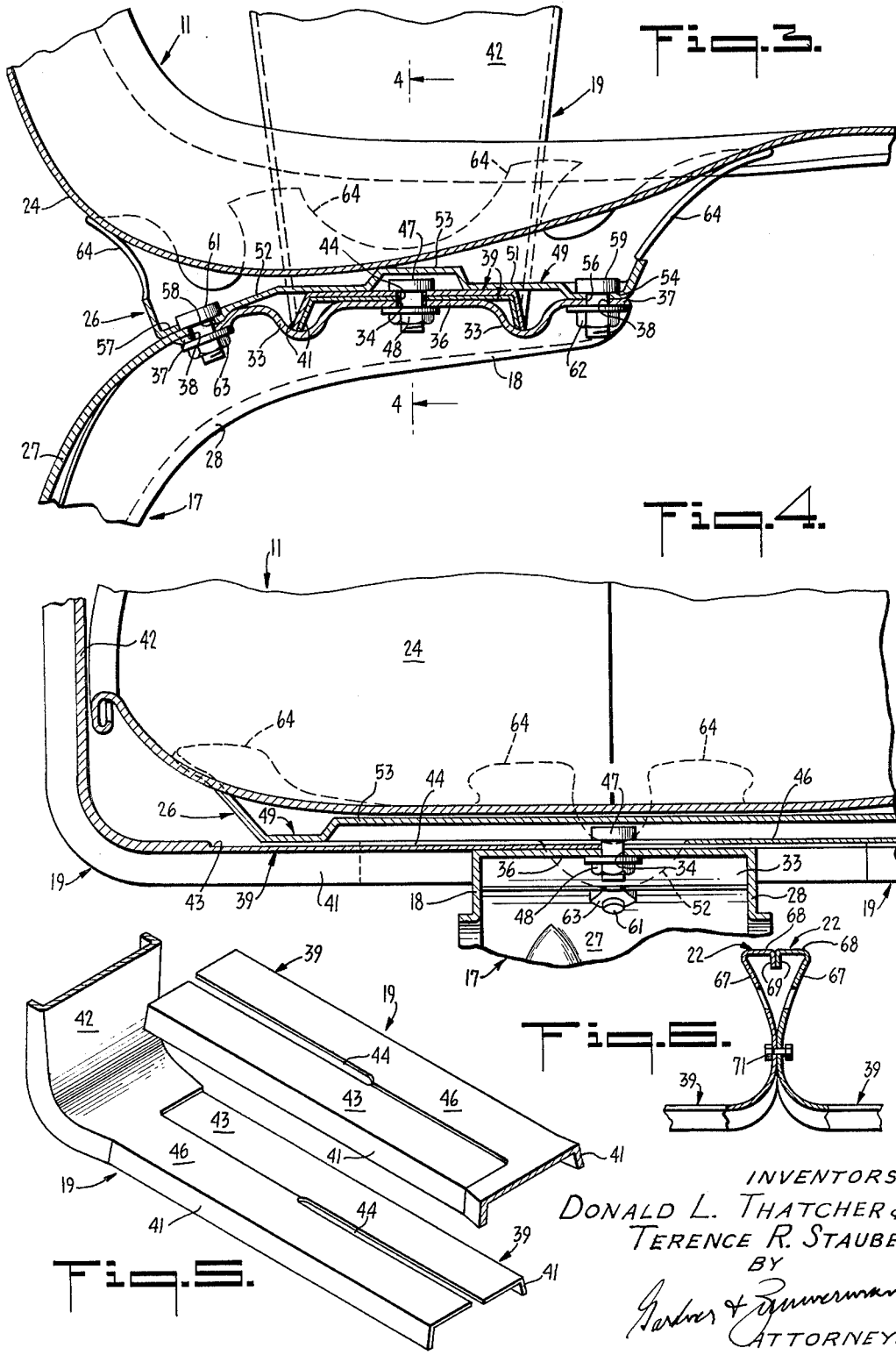

United States Patent Office 3,241,884
Patented Mar. 22, 1966

3,241,884
STADIUM SEAT CONSTRUCTION
Donald L. Thatcher, 127 Somerset Road, Piedmont, Calif., and Terence R. Stauber, 380 Bellvue Ave., Oakland, Calif.
Filed Dec. 6, 1963, Ser. No. 328,608
4 Claims. (Cl. 297—416)

The present invention relates to spectator seats as erected in stadiums, ballparks, and the like, and is particularly directed to a seat of this type which is so constructed that it may be readily installed in a stadium, for example, with a minimum of effort, and may be readily adjusted during installation to accommodate a variety of spatial situations imposed by diverse stadium configurations.

It is an object of the present invention to provide an improved seat for installation in stadiums and the like, which features a bucket configuration for increased seating comfort.

Another object of the invention is the provision of a spectator seat of such a construction that it may be installed by means of but several bolts and nuts, or other fasteners, in a minimum of time.

Still another object of the invention is the provision of a spectator seat having an interlocking two piece arm rest construction which facilitates ready adjustment of widthwise spacing between arm rests during installation of the seat such that the arm rests of adjacent seats may be abutted in arcuate sections of a stadium of varied curvature as well as in straight sections thereof.

It is yet another object of the invention to provide a seat of the class described which is of extremely strong durable construction.

It is a further object of the present invention to provide a seat construction of the class described which is entirely free of rough appendages upon which clothing might be snagged.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 1 is a front elevational view of a seat in accordance with the present invention.

FIGURE 2 is a side elevational view of the seat.

FIGURE 3 is a fragmentary sectional view on an enlarged scale taken at line 3—3 of FIGURE 1.

FIGURE 4 is a fragmentary sectional view taken at line 4—4 of FIGURE 3.

FIGURE 5 is an exploded perspective detail view of the interlocking arm rest members of the seat.

FIGURE 6 is a fragmentary sectional view of a modified form of arm rest structure which may be employed in the seat.

Referring now to FIGURES 1 and 2, there will be seen to be provided a seat 11 for spectator seating in a stadium, ballpark, or the like. As illustrated, the seat is installed in a stadium which has the usual stepped tiers 12 separated by vertical shoulder portions 13. As is conventional, each shoulder portion has an undercut longitudinally extending recess 14, and stud bolts 16 project outwardly from the recess at longitudinally spaced positions thereof. The seat 11 then includes an upwardly extending stanchion 17 having an outwardly curved horizontal support portion 18 at its upper end, the lower end of the stanchion being adapted for attachment to one of the stud bolts 16. Arm rest structure formed of a pair of interfitting members 19 which are slidable relative to each other is secured transversely to the support portion 18 of the stanchion. By virtue of the members 19 being slidable, the widthwise spacing between the arm rest portions 22 of these members may be adjusted as required, during installation of the seat, to fit varied spatial requirements imposed by tier sections of varied curvature. A bucket seat 24 secured to a support spider 26 is provided as a unitary component of the seat construction. The spider is secured to the support portion 18 of the stanchion in overlying relation to the members 19, the seat being transversely disposed between the arm rest portions 22 and thereby completing the seat construction.

Considering now the seat construction briefly outlined above in greater detail as to preferred structure, the stanchion 17 is preferably formed of sheet steel as by stamping or an equivalent forming process. The stanchion is advantageously of channel configuration in cross section and thus includes an upwardly extending web 27, which is outwardly turned at its upper end to define the horizontal support portion 18, and parallel flanges 28 right angularly turned from the opposite sides of the web. The lower end of the stanchion is provided with a generally rectangular boss 29 formed in the web thereof. The boss is conformed to the recess 14 in the shoulder between tiers of the stadium and provided with an aperture 31 to receive the stud bolt 16. With the bolt extending through the aperture, the boss snugly interfits the recess, and with a nut 32 tightened upon the bolt a rigid joint is provided between the base of the stanchion and the stadium structure. For purposes subsequently described, the upper surface of the horizontal support portion 18 of the stanchion is provided with a pair of spaced apart transverse grooves 33 substantially centrally thereof. An aperture 34 extends through the land region 36 intermediate the grooves 33. In addition, a pair of depressions 37 are provided in the support portion 18 on opposite sides of the grooves from the central land region 36. Apertures 38 extend through the bases of the depressions. To protect against snagging of clothing, etc., the stanchion is coated with plastic.

The members 19 of the arm rest structure are identical to each other to simplify manufacture. However, the members are so constructed that when they are disposed in opposed relationship to provide the arm rest structure they interlock to provide structural rigidity while being yet slidable with respect to each other. More particularly, each member 19 is provided with a substantially flat rectangular shank 39 having downwardly turned flanges 41 along their opposite side edges adapted to engage the grooves 33 in the top of the support portion of the stanchion. A side portion 42 is upwardly turned from one end of the shank, and the upper end of the side portion is inwardly turned to define the arm rest 22 which in the present case is in overlying spaced relation to the shank. A rectangular depression 43 is formed in the upper surface of the shank between the longitudinal center line and one side thereof. Such depression extends from the end of the shank to substantially the side portion 42. In addition, a slot 44 extends inward from the end of the shank along the longitudinal center line thereof and in part separates the relatively raised portion 46 of the shank from the depressed surface 43. Thus when a pair of the members 19 are disposed in opposed relationship, as best shown in FIGURE 5, with the ends of their shanks confronting, they may be slidably interlocked. More particularly, the slots 44 are interengaged with the depression 43 of one shank extending under the raised portion 46 of the other and vice versa.

One flange 41 of the first shank is disposed inwardly of one flange of the second shank while the second flange of the first shank is disposed outwardly of the second flange of the second shank. As a result a substantially flat interlocked channel assembly is provided wherein the flanges 41 are engageable with the grooves 33 of the support portion of the stanchion and the lower surface of the web of the assembly engages the land region 36. Moreover, the shanks are slidable with respect to each other to facilitate variation in the widthwise spacing between the arms 22. With the spacing appropriately adjusted the arm rest assembly is secured to the stanchion support portion 18 by means of a single bolt 47 and nut 48. The bolt 47 is inserted through the slots 44 of the interlocked shanks and through the aperture 34 in support portion 18, and the nut 48 is tightened upon the bolt against the underside of the support portion. Substantial structural rigidity is yet provided by virtue of the interlocked shank assembly and the flanges thereof engaging the grooves 33. The arm rest members 19 are preferably formed of aluminum, or equivalent material, coated with plastic to eliminate rough surfaces wihch might snag the clothing, or the like.

Considering now the support spider 26, same will be seen to include a base portion 49 which is appropriately conformed to the upper surface of the stanchion support portion 18 with arm rest members 19 secured thereto so as to be flushly mountable thereon. In this regard the base portion includes a forward section 51 and a rearward section 52 slightly inclined from the section 51. The forward section is arranged to rest upon the support portion 18 of the stanchion while the rearward section is arranged to rest upon the slightly curved transition region between the upright and support portions of the stanchion. The forward section 51 has a depression 53 in its lower surface which receives the head of bolt 47 and a boss 54 with an aperture 56 therethrough which engages the depression 37 in the support portion. The rearward section 52 has a boss 57 on its lower surface with an aperture 58 therethrough which engages the other depression 37 in the curved transition region of the stanchion. The spider is readily secured to the stanchion by a pair of bolts 59, 61 inserted through apertures 56, 58 and the underlying apertures 38 with nuts 62, 63 tightened upon the ends of the bolts.

The spider further includes a plurality of legs 64 which are upwardly curved from the periphery of the base portion 49 and define a generally dished out contour. Such contour conforms to that of peripheral portions of the bucket seat 24 which are received therein. The bucket seat 24 and spider 26 are preferably formed of aluminum, or the like, and the seat is advantageously secured to the spider, as by spot welding to the legs 64, at the factory such that the seat and spider are provided as a single component. In addition, the seat and spider are preferably coated with plastic, as in the case of the other components of the seat construction, to eliminate rough edges and prevent sngagging. It will be appreciated that with the seat and spider provided as a unitary component, the spaces between the legs of the spider facilitate manipulation of the bolts 59, 61 in the securance of the spider to the stanchion.

With a number of the seats provided as just described and installed in a stadium in rows, additional structural integrity is provided by securance of adjacent arm rests 22 of the respective seats together. Where the arm rest structures are provided as described hereinbefore with inwardly turned arm rest portions at the upper ends of the side portions 42, such upper ends of the side portions of adjacent arm rest structures are secured together as by means of fasteners 66. The arm rest structure may be modified, however, as shown in FIGURE 6 wherein side portions 67 are provided which are inwardly turned at acute angles to the shanks 39. The arm rests 22 are in this case defined by outwardly turned portions 68 at the upper ends of side portions 67, the outer edges of the portions 68 having downwardly turned edge flanges 69. The flanges 69 of adjacent arm rest portions 68 abut each other and the side portions 67 are secured together as by means of fasteners 71 adjacent the shanks 39.

What is claimed is:

1. A stadium seat construction comprising a stanchion including an upright base portion adapted for securance to a support surface and an outwardly curved horizontal support portion extending from the top of the base portion, a pair of arm rest members having shanks interlocking with each other and slidable relatively to each other, said shanks extending transversely to said support portion and adjustably secured thereto, said members having side portions extending upwardly from the shanks and arm rests at the tops of said side portions, so that the distance between said arm rests is adjustable by adjustment of said shanks, said shanks being rectangular and having longitudinally extending rectangular depressions between the longitudinal center line and one side thereof, said shanks having slots extending inwardly from their ends along their longitudinal center lines, said slots being interengaged with the depression of one shank underlying the relatively raised portion of the second shank and the depression of the second shank underlying the relatively raised portion of the first shank, and a bucket seat unit secured to said horizontal support portion in overlying relation to said shanks and disposed transversely intermediate said side portions.

2. A stadium seat construction comprising a stanchion having an upright base portion with a horizontal support portion outwardly curved from the base portion, said base portion adapted for attachment to a support surface, said horizontal support portion having a pair of spaced transverse grooves in its upper surface and an aperture extending through the land region between the grooves, a pair of arm rest members each including a rectangular shank with a side portion upwardly curved therefrom and a horizontal arm rest at the top of the side portion, said shank having downwardly turned flanges at the opposite sides thereof, said shank having a longitudinally extending rectangular depression between the longitudinal center line and one side thereof, said shank having a slot extending inwardly from its end along said longitudinal center line, said shanks disposed in opposition with their slots interengaged and the depression of one shank underlying the relatively raised portion of the second shank and the depression of the second shank underlying the relatively raised portion of the first shank, one flange of the first shank being disposed inwardly adjacent one flange of the second shank and the second flange of the first shank being disposed outwardly adjacent the second flange of the second shank, said shanks disposed with their flanges engaging said grooves of said stanchion, a bolt extending through said slots of said shanks and said aperture of said stanchion, a nut secured to the end of said bolt, and a bucket seat unit disposed between the side portions of said arm rest members and secured to the support portion of said stanchion.

3. A seat construction according to claim 2, wherein said bucket seat unit comprises a spider having a base portion with legs upwardly curved from the periphery thereof to define a dished out contour, said base portion of said spider secured to the support portion of said stanchion in overlying relation to the shanks of said arm rest members, and a bucket seat having peripheral portions secured to said spiders.

4. A seat construction according to claim 3, further defined by said stanchion, said arm rest members, said spider, and said bucket seat being formed of plastic coated metal.

(References on following page)

References Cited by the Examiner

UNITED STATES PATENTS

| | | | |
|---|---|---|---|
| 2,266,850 | 12/1941 | Connor et al. | 312—205 |
| 2,588,417 | 3/1952 | Schladermundt et al. | 297—445 |
| 2,812,800 | 11/1957 | Eames | 297—248 |
| 2,815,067 | 12/1957 | Richardson | 297—440 |
| 2,921,622 | 1/1960 | Henrikson et al. | 297—412 |
| 2,970,638 | 2/1961 | Halter | 297—458 |
| 3,115,368 | 12/1963 | Springer et al. | 297—421 |

FOREIGN PATENTS

| | | |
|---|---|---|
| 93,636 | 6/1962 | Denmark. |
| 858,246 | 1/1961 | Great Britain. |

FRANK B. SHERRY, *Primary Examiner.*